July 26, 1949.  E. G. GARTIN  2,477,054
CHUCK MECHANISM
Filed Nov. 8, 1944
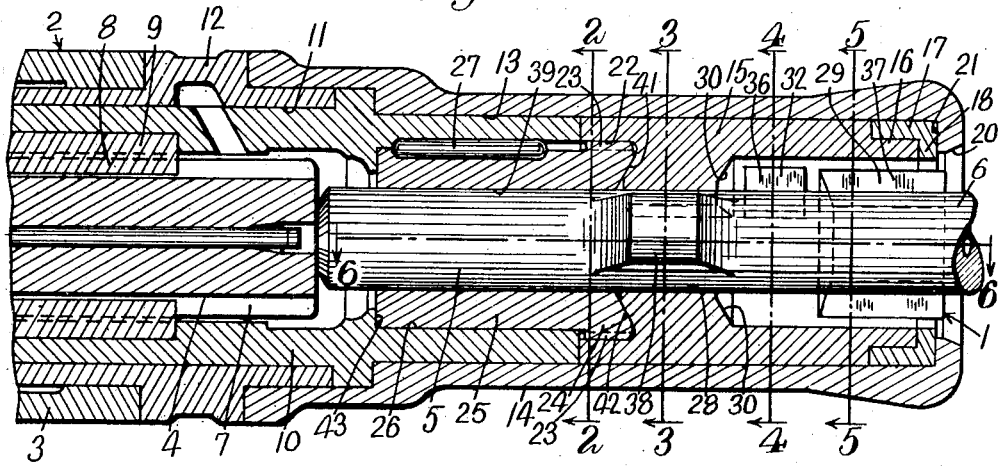
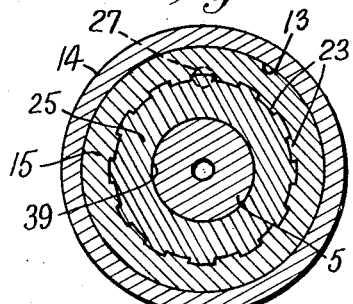
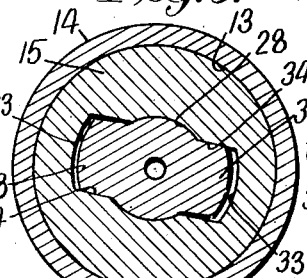
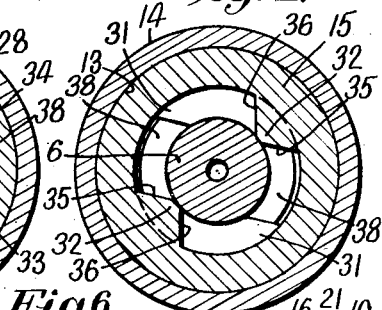
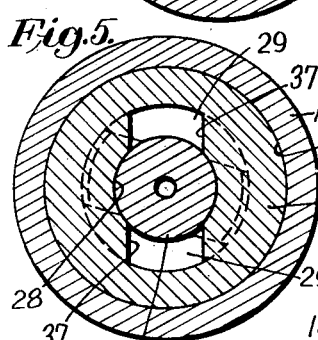
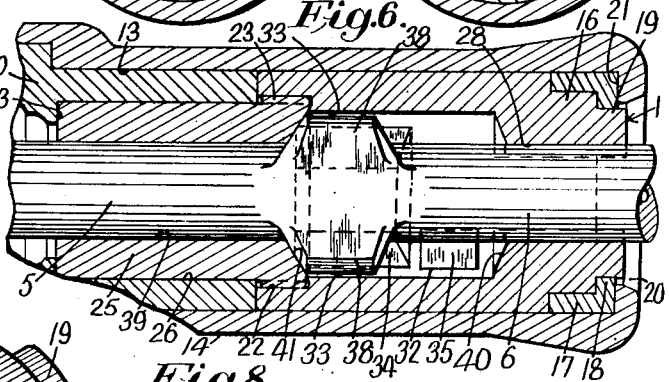
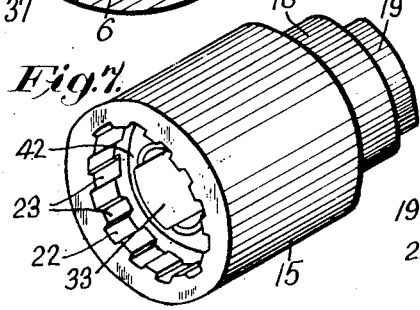
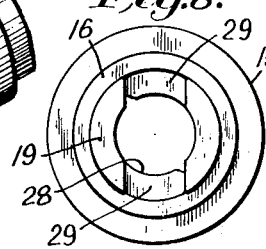
Inventor:
Elmer G. Gartin.
by
Atty.

Patented July 26, 1949

2,477,054

UNITED STATES PATENT OFFICE 2,477,054

CHUCK MECHANISM

Elmer G. Gartin, Claremont, N. H., assignor to Joy Manufacturing Company, a corporation of Pennsylvania Application November 8, 1944, Serial No. 562,446

10 Claims. (Cl. 279—19.3)

This invention relates to chuck mechanisms and more particularly to improvements in a chuck mechanism for the drill steel of a hammer rock drill.

It is an object of the present invention to provide an improved chuck mechanism. It is another object to provide an improved chuck mechanism embodying improved means for supporting, retaining and driving a drill steel. Still another object is to provide an improved chuck mechanism having improved driving and retaining means embodied in a single part, thereby eliminating the joint between separable parts as in previous known devices, resulting in increased efficiency. A further object is to provide an improved chuck embodying improved steel driving and retaining means in a single rotatable part having an unbroken external peripheral bearing surface rotatably received in the bore of a chuck housing of a rock drill, resulting in an improved bearing mounting for the chuck part and reducing friction between the parts. A still further object is to provide an improved chuck part mounted in the bore of a chuck housing and having a front key opening, laterally enlarged recesses for receiving the steel lugs after they have been passed through the key opening to lock the steel in the chuck and grooves located rearwardly of the recesses out of alinement with the key opening for receiving the steel lugs when the latter are moved rearwardly from the recesses. A further object is to provide an improved chuck part having diametrically opposite grooves for receiving the steel lugs for preventing substantial rotation of the steel in either direction relative to the chuck part and providing driving surfaces engaging the steel lug for rotating the steel. Still another object is to provide an improved combined steel retaining and driving member having a smooth unbroken external cylindrical bearing surface rotatably received in the bore of a chuck housing. A still further object is to provide an improved chuck part of the above sort having a recess rearwardly of the lug receiving grooves for receiving a portion of a chuck bushing by which the steel shank is supported. A further object is to provide an improved chuck part having an internally toothed recess with which a chuck bushing has interlocking engagement whereby the chuck part may be rotated through the chuck bushing. These and other objects and advantages of the invention will, however, hereinafter more fully appear.

In the accompanying drawing there is shown for purposes of illustration one form which the invention may assume in practice.

In this drawing:

Fig. 1 is a longitudinal vertical sectional view taken through the forward portion of a rock drill which embodies an illustrative form of the improved chuck mechanism.

Figs. 2, 3, 4 and 5 are cross-sectional views taken substantially on lines 2—2, 3—3, 4—4 and 5—5 respectively of Fig. 1.

Fig. 6 is a view in longitudinal vertical section taken substantially on line 6—6 of Fig. 1.

Fig. 7 is a perspective view of the improved one-piece chuck part.

Fig. 8 is a front end view of the chuck part shown in Fig. 7.

In this illustrative embodiment of the invention the improved chuck mechanism is generally designated 1 and is embodied in a hammer rock drill generally designated 2. Evidently various features of the improved chuck mechanism may be embodied in other sorts of tools.

The rock drill 2 is of a conventional design and includes a pressure fluid motor having a cylinder 3 containing a reciprocable hammer piston provided with a front striking bar 4 adapted to deliver impact blows to the shank 5 of a conventional lugged drill steel 6. As is usual in hammer rock drills, the hammer piston is rotated as it is reciprocated, and this rotative piston movement is transmitted to the drill steel so that, as the latter is percussively actuated, it is intermittently rotated. The piston rotation is transmitted to the drill steel through straight grooves 7 on the piston striking bar slidingly interlocked with straight keys 8 on a chuck nut 9, the latter suitably fixed to a rotatable driving sleeve 10. This driving sleeve is rotatably mounted in a bore 11 in a member 12, and in a bore 13 in a front chuck housing 14 in which the chuck mechanism is housed. The member 12 and the chuck housing 14 are suitably attached to the front end of the motor cylinder 3. Since the rock drill structure above described is well known to those skilled in the art further description thereof is herein unnecessary.

Referring to the improved chuck mechanism 1 and more particularly to the specific structure thereof, it will be noted that the chuck housing 14 has rotatably mounted in its bore 13 a combined steel retaining and driving member 15 formed in a single part. The chuck part 15 has a smooth unbroken external cylindrical peripheral surface fitting the chuck housing bore 13 so that a bearing surface of large area for the rotatable chuck part is afforded. The chuck part 15 has a reduced cylindrical forward portion 16 surrounded by a bearing sleeve or bushing 17 fitted within the forward portion of the chuck housing bore, and provided with an inwardly directed annular flange 18 which surrounds a further reduced front portion 19 of the chuck part 15. The reduced portion 19 projects into a reduced front opening 20 at the front end of the chuck housing 14 as shown. The forward face of the bushing 17 abuts a shoulder 21 at the juncture of the housing bore 13 with the reduced opening 20 and the reduced portion 16 of the chuck part 15 abuts the rear face of the bushing flange 18. The chuck part 15 has a circular recess 22 at its rear end, and the walls of this recess are formed with teeth 23 interlocked with corresponding teeth on the front collared portion 24 of a chuck bushing 25, the latter being fitted in a bore 26 in the drive sleeve 10. This chuck bushing is secured as by a key 27 to the drive sleeve so that when the sleeve is rotated, the chuck part 15 is rotated therewith through the chuck bushing 25. Extending centrally within the rotatable chuck part 15 is a bore 28 having opposite walls thereof longitudinally slotted at 29 (Figs. 1 and 5) diametrically of the forward portion of the chuck part 15 to provide a key opening, and these slots completely cut away the walls of the reduced portion 19, as shown in Figs. 1 and 8. These slots 29 extend rearwardly into the chuck part 15 and are terminated at their rearward ends by forwardly facing surfaces 30, and the opposite walls of the rearward portions of the slots are laterally recessed or enlarged at 31 (see Fig. 4). Narrow remaining wall portions or abutment lugs 32 are located between these lateral recesses 31 to provide stops as will later be explained. Disposed angularly with respect to the longitudinal key opening slots 29 and projecting rearwardly from the lateral recesses 31 are diametrically opposite slots or grooves 33 on the inner walls of the chuck part 15 (Figs. 3 and 6). The forward walls 34 of the slots 33, in terms of chuck rotation, are coplanar with, i. e. lie in substantially the same surfaces as, surfaces 35 of the abutment lugs 32, and opposite surfaces 36 of these abutment lugs are substantially coplanar with the forward walls 37, in terms of chuck rotation, of the key opening slots 29. The shank 5 of the drill steel may be inserted in the central opening 28 in the chuck part 15 and moved rearwardly to pass lugs 38 on the steel shank through the key opening slots 29, and the steel lugs may be shoved inwardly until they engage the forwardly facing surfaces 30 at the rear ends of the slots 29 with the steel lugs at that time located in the recessed or enlarged portions 31 of the chuck member. The drill steel may then be turned to move the steel lugs 38 in the lateral recesses or enlargements 31 into engagement with the surfaces 35 on the abutment lugs 32, thereby bringing the steel lugs out of registry with the key opening slots 29 to lock the steel shank in the chuck. As the steel shank is moved rearwardly to bring the steel lugs against the surfaces 30, the steel shank enters a central bore 39 in the chuck bushing. When the steel lugs 38 are against the lug surfaces 35, they may be shoved further rearwardly to bring them into the slots or grooves 33 with the steel shank assuming the position shown in Figs. 1 and 6, wherein it may receive the blows of the piston striking bar. The opposite walls of the grooves 33 prevent appreciable rotation of the steel shank in the chuck member in either direction. The forward walls 34 of the grooves 33 provide relatively wide driving and bearing surfaces for the steel lugs 38 and permit longitudinal reciprocation of the steel through a substantial distance while reducing the possibility of the steel inadvertently unlocking and becoming driven from the chuck. By moving the steel lugs forwardly from the grooves 33 into the lateral recesses 31, the drill steel may be turned in the chuck to bring the steel lugs 38 into engagement with the surfaces 36 of the abutment lugs 32 wherein they are in registry with the key opening slots 29, and the drill steel may then be withdrawn forwardly from the chuck by passing the steel lugs out through the key opening. In this instance, the opposite ends of the steel lugs 38 are inclined, and the rear surfaces 30 at the rear ends of the slots 29 and surfaces 40 at the forward ends of the grooves 33 are inclined for engagement by the inclined lug surfaces. The forward end of the bushing 25 is tapered at 41 also for engagement by the rear lug surfaces at the rear ends of the grooves 33. The forward wall of the recess 22 in the chuck part 15 is also inclined at 42 to fit, between the grooves 33, against the tapered surface 41 on the bushing 25. The rear end surface of the bushing 25 seats against a shoulder 43 on the drive sleeve 10 as shown in Figs. 1 and 6.

As a result of this invention an improved chuck mechanism is provided having improved supporting, retaining and driving means for the drill steel. It will further be evident that by the provision of the steel retaining and steel driving means embodied in a single rotatable chuck part without joints, it is possible to provide a smooth unbroken cylindrical peripheral bearing surface for the chuck part, resulting in increased efficiency. The improved rotatable chuck part has a bearing surface of relatively large area in the chuck housing bore, thereby improving the mounting for the chuck. By combining the steel retaining means and the steel driving means in a single chuck part, the structure is simplified and made more rugged. Other uses and advantages of the improved chuck mechanism will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a chuck mechanism for use with a lugged drill steel, a chuck housing having a bore, a rotatable one-piece steel-driver and retaining member having an unbroken peripheral bearing surface and rotatably received in said chuck housing bore, said member having a front key opening and internal projections provided with recesses therebetween to form a chamber located rearwardly of said key opening for receiving the steel lugs when the latter are passed rearwardly through said key opening, the steel lugs being rotatable in the chamber so provided and said projections providing abutment surfaces with which the steel lugs are engageable when so rotated to limit steel rotation, the steel lugs when in engagement with said abutment surfaces being located in locked position with respect to said key opening, and said member having diametrically opposite grooves on its inner walls opening forwardly into the chamber for receiving the steel lugs when the latter are moved rearwardly from the chamber, and the sides of the grooves which engage the steel lugs during steel driving during drilling being coplanar with said abutment surfaces, and said grooves preventing substantial rotation of the steel in either direction relative to said member, and a separate chuck bushing aligned with said member and adapted to receive and support the shank of the drill steel, said bushing closing the rear ends of said grooves and providing an abutment for the steel lugs when the latter are in their rearmost position in said grooves.

2. In a chuck mechanism for use with a lugged drill steel, a chuck housing having a bore, a rotatable steel-driver and retaining member having an unbroken cylindrical bearing surface and rotatably mounted in said chuck housing bore, said member having diametrically opposite internal grooves on its inner walls and internal projections having abutment surfaces coplanar with the driving surfaces of said grooves, said member having a front key opening, there being a chamber formed within the forward portion of said member rearwardly of said key opening and in advance of said grooves and into which the latter open, and the lugs of the steel upon rearward insertion thereof through said key opening moving into the chamber and turnable in the chamber into engagement with said abutment surfaces on said projections, the lugs of the steel when in engagement with said abutment surfaces being out of registry with said key opening, the steel lugs when in engagement with said abutment surfaces being movable rearwardly from said chamber into said grooves, and said grooves holding the steel against substantial rotation in either direction relative to said member, and a separate chuck bushing aligned with said member and adapted to receive and support the shank of the drill steel, said bushing closing the rear ends of said grooves and providing at its front end an abutment for the steel lugs when the latter are in their rearmost position in said grooves.

3. A drill steel chuck mechanism comprising a combined driver and retaining member for a lugged drill steel, comprising a front key opening and rearwardly of said key opening internal projections provided with recesses therebetween to form a chamber for receiving the steel lugs when the latter are passed rearwardly through the key opening, the steel lugs being rotatable in the chamber so provided and said projections providing abutment surfaces with which the steel lugs are engageable when so rotated to limit steel rotation, the steel lugs when in engagement with said abutment surfaces being located in locked position with respect to said key opening, said member having diametrically opposite grooves for receiving the steel lugs when the latter are moved rearwardly from the chamber, and the sides of the grooves which engage the steel during steel driving during drilling being coplanar with said abutment surfaces, and said grooves preventing substantial rotation of the steel in either direction relative to said member, and said member having a circular recess rearwardly of said grooves, and a chuck bushing by which the steel shank is supported and having a forward portion received in said circular recess for maintaining said bushing and said member in axial alignment.

4. A drill steel chuck mechanism comprising a combined driver and retaining member for a lugged drill steel, comprising a front key opening and rearwardly of said key opening internal projections provided with recesses therebetween to form a chamber for receiving the steel lugs when the latter are passed rearwardly through the key opening, the steel lugs being rotatable in the chamber so provided and said projections providing abutment surfaces with which the steel lugs are engageable when so rotated to limit steel rotation, the steel lugs when in engagement with said abutment surfaces being located in locked position with respect to said key opening, said member having diametrically opposite grooves for receiving the steel lugs when the latter are moved rearwardly from the chamber, and the sides of the grooves which engage the steel during steel driving during drilling being coplanar with said abutment surfaces, and said grooves preventing substantial rotation of the steel in either direction relative to said member, and said member having an internally toothed recess rearwardly of said grooves, and a chuck bushing having a forward toothed portion in interlocking engagement with said toothed recess whereby said chuck bushing, upon rotation thereof, effects rotation of said member.

5. In a chuck mechanism for supporting, rotating and retaining a lugged drill steel, a chuck housing having a bore, a chuck member having an unbroken external bearing surface and rotatably supported in said bore and having intercommunicating openings for receiving the shank and lugs of a drill steel and, rearwardly of said openings, a recess of a shape and size such as to receive the lugged portion of a steel and permit limited free relative rotation between such portion and said member, said member having means disposed rearwardly of said recess and providing surfaces for limiting rectilinear movement of the lugs inwardly after they have passed through the first mentioned openings for receiving them, and further providing a bore and diametrically oppositely disposed recesses on its inner walls and communicating forwardly with said recess, said first mentioned recess and said second mentioned recesses adapted respectively to receive the shank portion and the lugs of a drill steel, and said member still further providing surfaces extending forwardly substantially to the forward end of said first mentioned recess, said second mentioned recesses receiving the lugs during drilling and holding the drill steel against substantial rotation in either direction relative to said member, and said last mentioned surfaces constituting forward extensions of the rearward sides of said second mentioned recesses whereby, whether during drilling or during removal of the steel from a hole, the lugs of the steel may be driven over the major portion of the rearwardly facing sides of said surfaces, said second mentioned recesses opening rearwardly through the rear portion of said chuck member, and a chuck bushing adapted to receive the steel shank and cooperating with said chuck member to close the rear ends of said second mentioned recesses and to provide rearward stops for the steel lugs.

6. In a drill steel chuck mechanism, a chuck housing having a bore, a rotatable chuck having a smooth unbroken cylindrical bearing surface and journaled in said bore, said member having a front key opening and rearwardly of said key opening surfaces cooperating to provide the boundaries of a recess of such size and conformation as to permit limited turning movement between the lugs of a lugged drill steel and said member, and said key opening being formed to permit the passage of a lugged drill steel shank therethrough and into said recess, and said member having projections thereon extending into said recess and providing stop surfaces to cooperate with the lugs of a drill steel for limiting relative turning movement between the steel and said member, and said member providing openings along its inner walls rearwardly of said recess and opening forwardly thereinto for receiving the lugs of a drill steel and holding the same against substantial rotation in either direction relative to the driver member, said last mentioned openings bounded at their rearward sides, in terms of chuck member rotation, by surfaces whose longitudinally extending elements are substantially in alinement with longitudinally extending elements of said stop surfaces, said lug-receiving openings extending rearwardly out through the rear portion of said chuck, and a separate chuck bushing aligned with said chuck and closing the rear ends of said lug-receiving openings, and the forward end of said bushing providing an abutment for the steel lugs when the latter are in their rearmost position in said lug-receiving openings.

7. In a drill steel chuck mechanism, a chuck housing having a bore, a rotatable chuck member having an unbroken external bearing surface and journaled in said bore and having a front key opening, said key opening being formed to permit the passage of the lugs of a lugged drill steel shank therethrough, and said member having an internal chamber having portions in which said lugs are turnable relative to said member and having longitudinally extending, substantially diametrically oppositely disposed walls for limiting the relative movement between said lugs and said members and halting the relative turning movement in a position in which said lugs are angularly displaced with respect to said key opening, said member formed to provide substantially diametrically oppositely disposed openings along its inner walls opening forwardly into said chamber for receiving the lugs when the same have passed rearwardly beyond said chamber and to maintain said lugs against substantial rotation in either direction relative to said member when in said openings, said openings last mentioned having at their rearward sides, in terms of chuck member rotation, walls each of which lies in substantially the same surface with one of said first mentioned walls, said lug-receiving openings extending rearwardly out through the rearward portion of said chuck member, and a rotatable member for rotating said chuck member, said rotatable member closing the rear ends of said lug-receiving openings and providing a rear abutment for the steel lugs in said lug-receiving openings.

8. In a chuck mechanism for supporting, rotating and retaining a lugged drill steel, a chuck housing having a bore for rotatably receiving a steel supporting and rotating and steel retaining device, a supporting, rotating and retaining member having a smooth unbroken external bearing surface and rotatably supported in said bore and having intercommunicating openings for receiving the shank and lugs of a drill steel, the drill steel and said member being relatively rotatable to effect a positioning of the parts in which the steel lugs are out of registry with said lug receiving openings, to lock the steel in the chuck mechanism, and said member also providing surfaces for limiting the angular movements of the lugs when the latter are in locked position with respect to said member, and longitudinal recesses on the inner walls of said member for receiving said lugs and holding the steel against substantial rotation in either direction relative to said member, said member having a circular bore within its rearward portion, and a chuck bushing adapted to receive and support the shank of the drill steel and fitted at its forward portion within said circular bore to maintain said bushing and said member in axial alignment, said bushing closing the rear ends of said longitudinal recesses and providing at its forward end an abutment with which the steel lugs engage when in their rearmost position in said longitudinal recesses.

9. In a chuck mechanism for a drill steel, a rotatable drive sleeve, a steel driver member for rotating a drill steel, and a chuck bushing secured to said drive sleeve for rotation therewith and having its forward portion projecting in advance of the forward end of said sleeve, said driver member having at its rear end a circular recess for receiving the forwardly projecting portion of said bushing, said bushing being secured to said driver member and providing the driving connection between said drive sleeve and said driver member.

10. In a chuck mechanism for a drill steel, a rotatable drive sleeve, a steel driver member for rotating a drill steel, and a chuck bushing secured to said drive sleeve for rotation therewith and having its forward portion projecting in advance of the forward end of said sleeve, said driver member having at its rear end an internally toothed recess and the forwardly projecting portion of said bushing having external teeth interlocked with the teeth of said recess whereby said bushing provides the driving connection between said drive sleeve and said driver member.

ELMER G. GARTIN.

REFERENCES CITED

The following references are of record in the file of this patent:

UNITED STATES PATENTS

| Number | Name | Date |
|---|---|---|
| Re. 22,536 | Curtis | Aug. 29, 1944 |
| 1,208,224 | Smith | Dec. 12, 1916 |
| 1,574,016 | Bayles | Feb. 23, 1926 |
| 1,716,443 | Hulshizer | June 11, 1929 |
| 1,788,972 | Bayles | Jan. 13, 1931 |

FOREIGN PATENTS

| Number | Country | Date |
|---|---|---|
| 240,914 | Great Britain | 1925 |